Jan. 17, 1933.  M. VAN DER SCHANS ET AL  1,894,286
GUIDE BLOCK, PULLEY BLOCK, AND THE LIKE
Filed Jan. 13, 1931
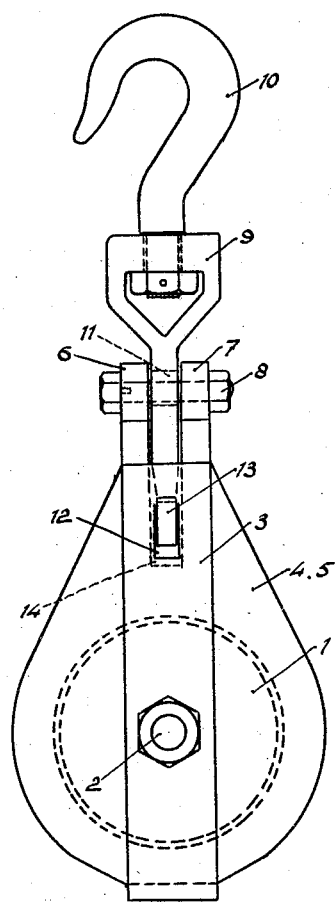
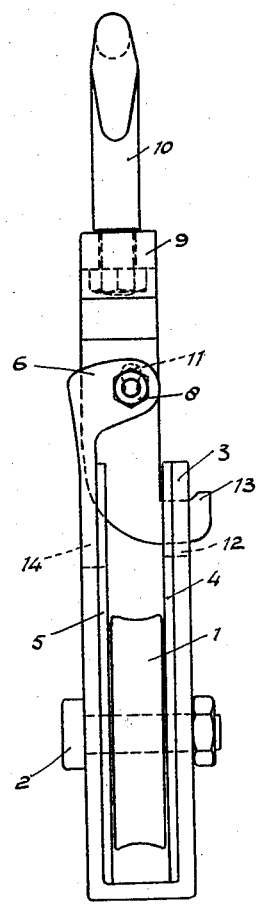
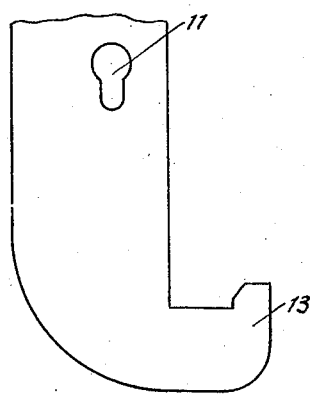
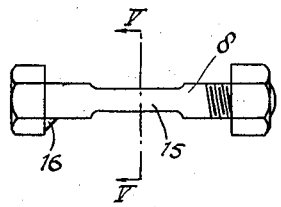
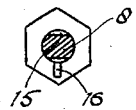
Inventors
Martien van der Schans
Gerrit Hilgers
per
Attorney Patented Jan. 17, 1933

1,894,286

UNITED STATES PATENT OFFICE

MARTIEN VAN DER SCHANS, OF KRIMPEN-ON-THE-IJSSEL, AND GERRIT HILGERS, OF ROTTERDAM, NETHERLANDS, ASSIGNORS TO THE FIRM OF WED. C. STINIS, OF KRIMPEN-ON-THE-LEK, SOUTH-HOLLAND, NETHERLANDS, A DUTCH FIRM

GUIDE BLOCK, PULLEY BLOCK AND THE LIKE

Application filed January 13, 1931, Serial No. 508,474, and in the Netherlands September 16, 1930.

This invention relates to guide and snatch blocks, pulley blocks and the like, such as are widely used for guiding ropes, chains and similar drawing means, as in block and tackle gear and for loading ropes, chains and the like round corners, and sometimes referred to as leading or quarter blocks.

In the ordinary pulley block, the axle of the pulley is carried by a stirrup or sheave at the sides of which project two protecting plates. These plates are provided for the purpose of guiding and protecting the rope so that it cannot spring off the pulley, and in addition they are a protection for persons in the neighbourhood of the pulley block, because ropes which are moving at high speed over pulleys may form a very real danger to persons standing by. In some cases, also, the said stirrup or sheave carries, in addition, a suitable fastening device, generally a turnable hook which is arranged at right angles to the median line of the pulley axle and by means of which the pulley block can be fixed up in any desired manner.

The rope is thus quite enclosed in the pulley block, i. e. in the working position it cannot be taken out sideways from the pulley. This is essential in order to ensure a strong construction as well as to avoid the danger of the rope springing outwards. As a consequence, a device must be provided which permits, as circumstances require, the sideways insertion or removal of the rope. In the usual constructional form, the pulley block has for this purpose a hinged part embodied in the sheave or stirrup, which part can be turned open and bolted in any manner whatever in closed position. This construction has the disadvantage which all severely and unequally loaded hinges generally exhibit, namely, severe wear, and a gradual tendency for the connection to become looser. The whole construction thus soon loses its rigidity. Such blocks, moreover, soon assume crooked or oblique positions and there then arises an unfavourable loading of the parts, greater rubbing of the rope, and consequently still more severe wear, and there is also a danger of the rope running out of the pulley or roller. The hinged parts also frequently become loose during the operation, and the rope can then spring outwards. Thus their use is accompanied by greater danger to the bystander.

The object of the present invention is to provide a guide and snatch block, pulley block or the like whereby these drawbacks are obviated and a strong and permanently efficient construction is obtained.

According to the invention a guide block, pulley block or the like is provided in which a member or device adapted to carry a hook or other attachment means is turnably and slidably or otherwise movably arranged on a supporting or guiding part at one side of a pulley or other guide member, and is adapted to be engaged with a supporting or guiding part at the other side of the pulley or guide member, the construction being such that whilst ready insertion and removal of a rope or the like in the guide block or the like is permitted, the supporting parts can be made as a single unit or whole.

Preferably the turnable and slidable member carrying the hook is arranged on a bolt or other element provided in the supporting or guide part at one side of the pulley or guide member, the said bolt or element passing through a lengthwise slot in the said member. It is also preferable that the member carrying the hook be supported in its working position equally by the supporting or guiding parts at both sides of the pulley or guide member.

A pulley block embodying the invention will now be described, by way of example, with reference to the annexed drawing, in which:—

Figs. 1 and 2 show respectively a front view and a side view of the pulley block.

Figs. 3, 4 and 5 show further details of the invention.

We may now proceed with a description of the invention, due reference being had to the drawing.

The pulley 1 is rotatably mounted on an axle formed by a bolt 2 which is carried by a two-part or bifurcated sheave 3. On the inner side of the sheave 3, two protecting plates 4, 5 are preferably arranged, these plates projecting over the edge of the pulley 1. One part of the sheave 3 is extended to form two bearing supports 6, 7 through which projects a bolt 8. Between the two bearing supports, an intermediate latch member 9 is swingably mounted which carries a turnable hook 10 and which at the place where the bolt 8 passes through is provided with a lengthwise slot 11. This slot 11 has at the end on the side of the hook 10 a circular portion in which the body of the bolt 8 pivotally moves. The other portion of the slot 11 is narrower and in correspondence therewith a bolt 8 is provided in its middle with a flat portion 15 which is conformed to the width of this narrower portion of the slot 11, and also in length as well, so that the bolt 8 can enter it, although only in a predetermined position. For preventing turning of the bolt 8 in the bearing supports 6 and 7, it is provided with a screw locking device as indicated by 16. The end of the member 9 which is remote from the end of the hook 10 extends through the slot 12 of the other part of the sheave 3 and is provided with a nose 13. If the member 9 is pressed in the direction of the pulley 1, which can be done in virtue of the slots 11 and 12, the nose 13 is freed from the end of the sheave and can be withdrawn through the slot 12 by turning the member 9 with the circular portion of the slot 11 on the bolt 8. The member 9 is in this case moved through a slot 14 which is provided between the two bearing supports 6, 7, and after being turned, the member 9 cannot slide any more on the bolt 8, as this can only enter the narrower portion of the slot 11 in one position. The rope can then be pushed in between the parts of the sheave. After the member 9 has been again brought into the working position, it is pushed in the opposite direction from that above mentioned, in which movement it is assisted by the pull of the rope, and which movement cannot take place, due to the shape of the slot 11, unless the nose 13 has passed through the slot 12. The block thereupon again constitutes a closed unit. It must be considered in this connection that the part 9 is so constructed that in the working position it is borne equally by the bolt 8 and by the edge of the slot 12, and in this manner the load is distributed uniformly in both parts of the sheave, and thus a symmetrical loading is obtained.

The invention is not limited to pulley blocks but can also be applied to any other similar devices.

By the use of the invention, the block or sheave does not need to be divided into two parts, but can be kept as a single unit or whole, and throughout the movement of the member or part provided with the hook, connection is maintained with one of the ends of the sheave. Moreover, the hook connection made in accordance with the invention is such that it is drawn firm under the influence of the pull of the rope, and, in addition, the whole construction is very simple and reliable.

What we claim is:—

1. A snatch block including the combination, with a pair of corresponding block members having a pulley rotatably mounted between the same, of a latch member having a suspension means associated therewith and pivoted in one of said block members in a position rendering the same swingable about an axis transverse to the axis of said pulley, there being a slot in the other block member engageable by said latch member to provide a closure for said snatch block, whereby to retain a rope in association with said pulley, and means for effecting locking engagement of said latch member with said other block member.

2. A snatch block including the combination, with a pair of corresponding block members having a pulley rotatably mounted between the same, of a projection disposed upon one of said block members, a latch member having a suspension means and pivoted to said projection in a position rendering the same swingable about an axis transverse to the axis of said pulley, there being means associated with the other block member for retaining said latch member in locked relation with said other block member to provide a closure for said snatch block, whereby to retain a rope in association with said pulley, and means for effecting locking engagement of said latch member with said other block member.

3. A snatch block including the combination, with a pair of corresponding block members having a pulley rotatably mounted between the same, of a pair of cheeks disposed upon one of said block members, a latch member having a suspension means and pivoted between said cheeks in a position rendering the same swingable about an axis transverse to the axis of said pulley, there being a slot in the other block member engageable by said latch member to provide a closure for said snatch block, whereby to retain a rope in association with said pulley, and means for effecting locking engagement of said latch member with said other block member.

4. A snatch block including the combination, with a pair of corresponding block members having a pulley rotatably mounted between the same, of a pair of cheeks disposed upon one of said block members, there being corresponding slots in said cheeks, a latch member mounted between said cheeks having a suspension means and provided with pivot means located in said corresponding slots so as to render said latch member movable in limited manner between the cheeks and swingable about an axis transverse to the axis of said pulley, there being also a slot in the other block member engageable by said latch member to provide a closure for said snatch block, whereby to retain a rope in association with said pulley, and means for effecting locking engagement of said latch member with said other block member.

5. A snatch block including the combination, with a pair of corresponding block members having a pulley rotatably mounted between the same, of a pair of cheeks disposed upon one of said block members, having pivot means between them, a latch member mounted between said cheeks having a suspension means and provided with a slot, in which the said pivot means is located so as to render said latch member movable in limited manner between the cheeks and swingable about an axis transverse to the axis of said pulley, there being also a slot in the other block member engageable by said latch member to provide a closure for said snatch block, whereby to retain a rope in association with said pulley, and means for effecting locking engagement of said latch member with said other block member.

In testimony whereof, we affix our signatures.

MARTIEN van der SCHANS.
GERRIT HILGERS.